Nov. 17, 1953     R. B. ANDERSON     2,659,781
FLAT TIRE SIGNAL

Filed June 12, 1952     2 Sheets-Sheet 1

Raymond B. Anderson
INVENTOR.

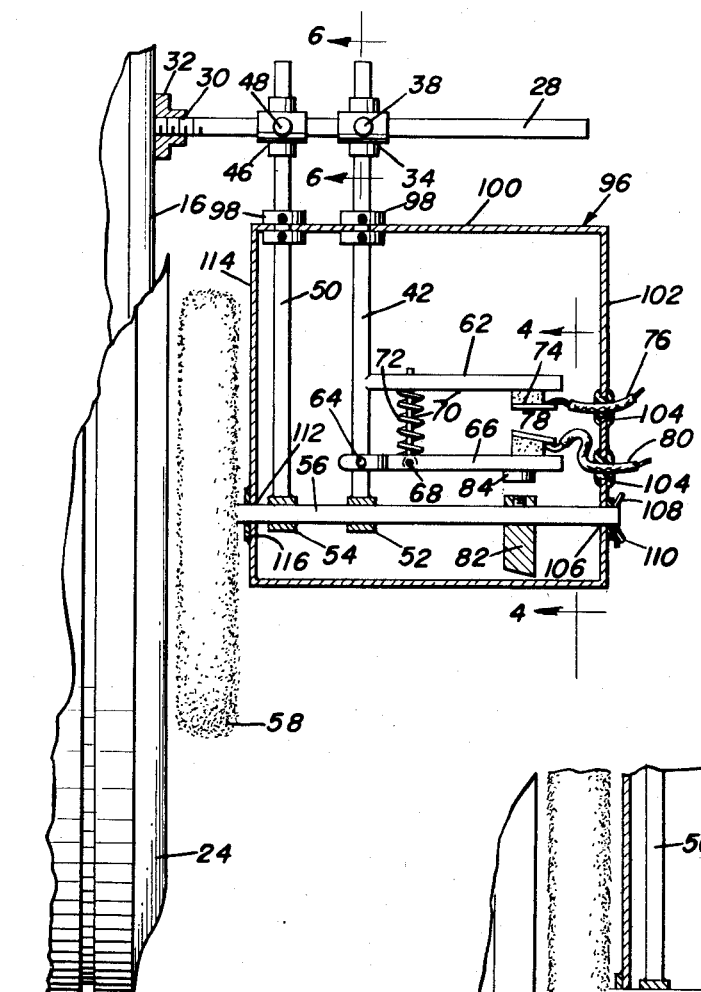
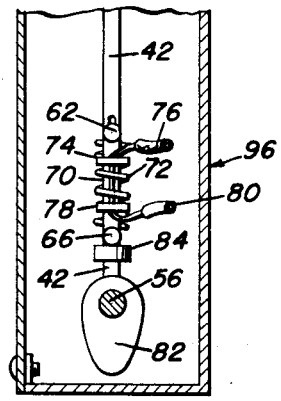
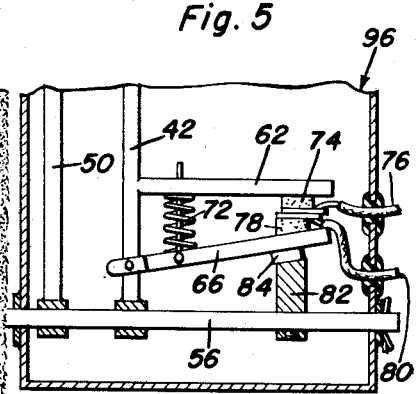
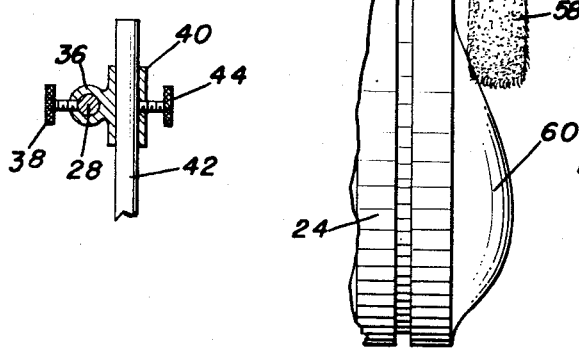

Patented Nov. 17, 1953

2,659,781

UNITED STATES PATENT OFFICE 2,659,781

FLAT TIRE SIGNAL

Raymond B. Anderson, Oklahoma City, Okla.

Application June 12, 1952, Serial No. 293,152

9 Claims. (Cl. 200—61.23)

This invention relates in general to signal devices, and more specifically to a signal device for indicating improper inflation of a vehicle tire.

The primary object of this invention is to provide an improved signal device for indicating improper inflation of a tire, said signal device being adapted to be actuated by a slight bulging of the tire whereby an operator of a vehicle may be warned prior to the actual existence of a flat tire.

Another object of this invention is to provide an improved signal device for indicating the improper inflation of a tire, said signal device being adapted to be secured to existing vehicles with a minimum of labor by conveniently connecting the same to a backing plate for brake shoes of an associated wheel.

Another object of this invention is to provide an improved signal device for indicating improper inflation of a tire, said signal device having supporting means for adjustably mounting the same, whereby the signal device may be properly positioned adjacent a tire for which it is intended to indicate the improper inflation thereof.

Another object of this invention is to provide an improved signal device which is of a relatively simple construction whereby it is economically feasible and is of a type which may be utilized in connection with tires of a vehicle for indicating improper inflation thereof.

A further object of this invention is to provide a warning device for indicating improper inflation of a vehicle tire, said warning device being mounted closely adjacent to a tire, but in a position whereby it is not subject to damage upon complete deflation of the tire.

With these objects definitely in view, this invention resides in certain novel features of construction, combination and arrangement of elements and portions as will be hereinafter described in detail in the specification, particularly pointed out in the appended claims, and illustrated in the accompanying drawings which form a material part of this specification, and in which:

Figure 3 is an enlarged fragmentary transverse vertical sectional view taken substantially from the plane located by the section line 3—3 of Figure 1 and shows the general construction of the warning device and the specific supporting means therefor;

Figure 4 is an enlarrged fragmentary transverse vertical sectional view taken substantially from the plane located by the section line 4—4 of Figure 3 and shows the general construction of the switch means of the warning device and means for actuating the same;

Figure 5 is an enlarged fragmentary transverse vertical sectional view similar to Figure 3 and shows relationship of a wheel of the warning device with respect to a bulge in the tire of the associated wheel;

Figure 6 is a fragmentary transverse vertical sectional view taken substantially from the plane located by the section line 6—6 of Figure 3 and shows the manner in which the vertical supporting member is adjustably connected to a horizontal supporting member.

Similar characters of reference designate similar or identical elements and portions throughout the specification and throughout the different views of the drawings.

Figure 1:
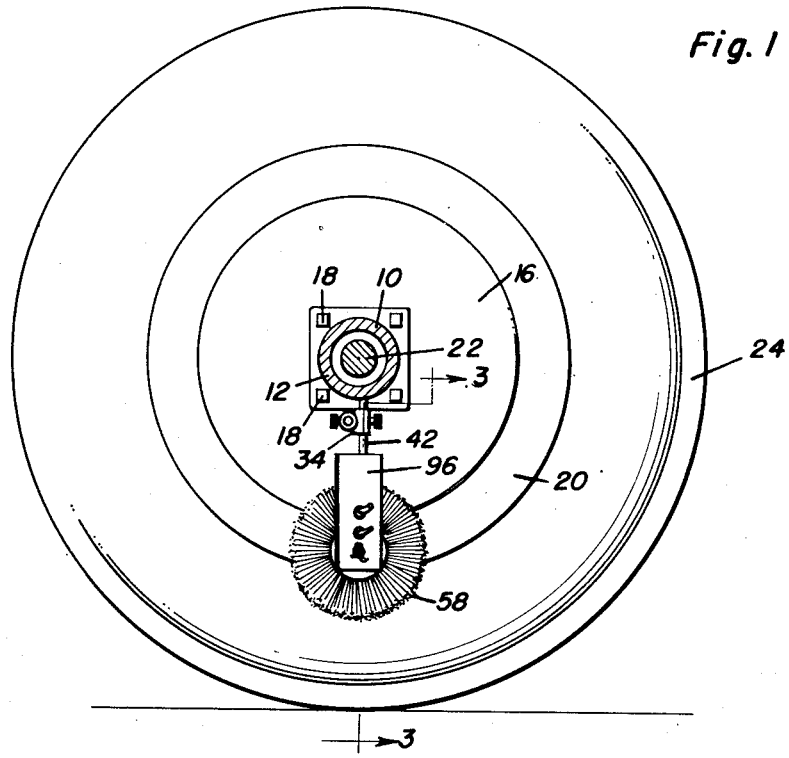
Figure 1 is a transverse vertical sectional view through a rear axial housing of a conventional vehicle and shows the warning device, which is subject of this invention, attached to a wheel and semi-carried at one end of the axial housing.

Referring now to the drawings in detail, it will be seen that there is illustrated a portion of a rear axle housing 10 of a conventional vehicle, the rear axle housing having secured to a flange 12 at one end thereof a wheel assembly, which is referred to in general by the reference numeral 14. The wheel assembly 14 includes a backing plate 16 on which brake shoes are mounted, the backing plate 16 being secured to the flange 12 by fasteners 18. The wheel assembly 14 also includes a wheel 20 mounted on a drum (not shown) connected to an axle 22 disposed in the axle housing 10. Mounted on the wheel 20 for rotation therewith is a conventional tire 24. It should be understood that when the tire 24 is not properly inflated that the side walls of same will bulge in the vicinity of its contacts with a supporting surface. In order that this bulging may be easily detected, there is provided the warning device, which is the subject of this invention, the warning device being referred to in general by the reference numeral 26.

The warning device 26 includes a horizontal support member 28 having an outer end thereof threadingly engaged in a threader-bore 30 of a fitting 32, the fitting 32 being secured to the inner surface of the backing plate 16 by any conventional fastening means including welding. Carried by the horizontal member 28 is a cruciform fitting 34 having a horizontal bore 36 through a horizontal leg thereof. Retained within the horizontal bore 36 is an intermediate portion of the horizontal member 28, the horizontal member 28 being retained within the bore 36 by a locking screw 38 associated therewith. The cruciform member 34 also includes a vertical bore 40 through a vertical leg thereof, said vertical bore 40 having adjustably positioned therein a vertical supporting member 42. The vertical supporting member 42 is positioned within the vertical bore 40 by a locking screw 44 associated therewith.

Carried by the horizontal member 28 is a second cruciform fitting, which is referred to in general by the reference numeral 46, the second cruciform fitting being identical to the cruciform fitting 34 and having a locking screw 48 for locking the fitting 46 on the horizontal member 28 in an adjusted position. Adjustably carried by the fitting 46 is a second vertical supporting member 50, the vertical supporting member 50 being in space parallel relation to the vertical supporting member 42 and being positioned between the supporting member 42 and the wheel assembly 14.

The lower ends of the vertical supporting members 42 and 50 are provided with bearing portions 52 and 54, respectively, in which is mounted for rotation a horizontal shaft 56. Mounted on the outer end of the horizontal shaft 56 for rotation therewith is a small fiber wheel 58, the fiber wheel 58 being positioned closely adjacent the tire 24 and is adapted to engage a bulge in the side wall thereof due to improper inflation thereof. The bulge in the tire 24 is best illustrated in Figure 5 and is referred to by the reference numeral 60.

Referring now to Figure 3 in particular, it will be seen that carried by the vertical supporting member 42 in vertically spaced relation to its associated bearing 52 is an inwardly extending arm 62, the arm 62 being in vertically spaced parallel relation to the shaft 56. Pivotally connected to the vertical supporting member 42 by a horizontal pivot pin 64 is a movable arm 66, the movable arm 66 being positioned between the arm 62 and the shaft 56. In order that the movable arm 66 may be urged into a position parallel to both the arm 62 and the shaft 56, the movable arm 66 has pivotally connected thereto by pivot pin 68 a vertically extending rod 70, the upper end of the rod 70 being movably supported by the arm 62. Mounted on the rod 70 is a compression spring 72 having opposite ends thereof in engagement with arms 62 and 66 to urge the arms 66 downwardly from the arms 62. It will be understood that the arm 66 is provided with a stop portion (not shown) engageable with the vertical supporting member 42 to limit the downward movement thereof.

The fixed arm 62 is provided with a fixed contact 74 on the lower side thereof, the contact 74 being connected to a wire 76. Carried by the end of the arm 66 on the upper side thereof for engagement with the fixed contact 74 is a movable contact 78. The movable contact 78 has connected thereto a wire 80 which may be considered to be a continuation of the wire 76.

In order that the rotary motion of the wheel 58 and its associated shaft 56 may be utilized to close the contacts 74 and 78, the shaft 56 has mounted thereon a cam 82 which underlies the inner end of the movable arm 66. The underside of the movable arm 66 is provided with a cam engageable shoe 84 which is engaged by the cam 82 upon rotation of shaft 56 to urge the movable arm 66 upwardly. It will be seen that the upward movement of the movable arm 66 by the cam 82 is such that the movable contact 78 is moved into contact with the fixed contact 74.

Figure 2:
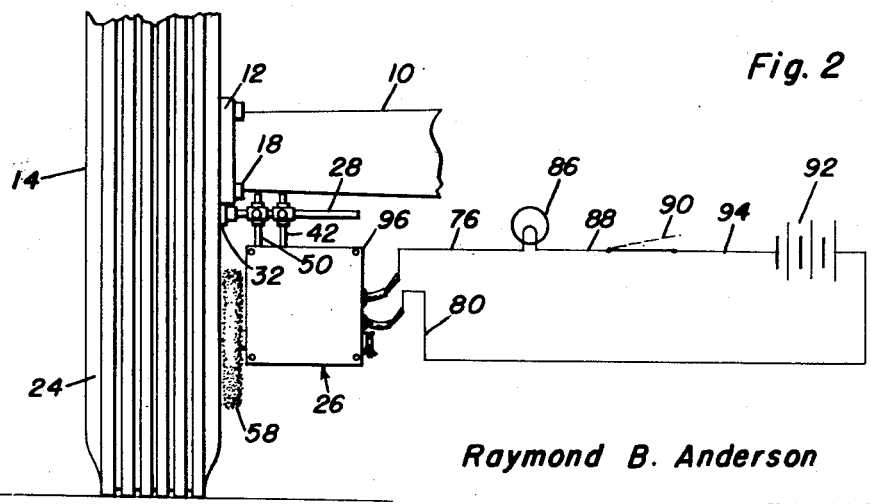
Figure 2 is a fragmentary rear elevational view of the axial housing of Figure 1 and shows the manner in which the warning device is associated with the wheel.

Referring now to the Figure 2 particularly, we see that the wire 76 is connected to a lamp 86, the lamp 86 being adapted to be mounted upon a dash of the vehicle with which the wheel assembly 14 is a part of or associated with. Extending from the lamp 86 is a wire 88 which is connected to a switch 90, the switch 90 being in turn connected to one terminal of a battery 92 by a wire 94. The wire 80 is connected to the other terminal of the battery 92 to form a complete circuit when the switch 90 and the contacts 74 and 78 are closed. Inasmuch as the rotation of the wheel 58 by the bulge 60 in the tire 24 will light the lamp 86 on the dash of the vehicle, the operator of the same will be immediately warned upon the partial deflation of the tire 24. It will be understood that the switch 90 is to be utilized to break the circuit to the lamp 86 when the tire 24 is permitted to remain flat for a period of time.

Referring now to Figure 3 particularly, we see that the switch mechanism and major portion of the shaft 56 is disposed within a water and dust tight housing, which is referred to in general by the reference numeral 96. The housing 96 is supported by adjustable collars 98 adjustably positioned upon the vertical supporting members 42 and 50 and clamping the top wall 100 of the housing 96 therebetween. It will be understood that the vertical supporting members 42 and 50 passed through the top wall 100 and their associated openings are closed by the collars 98. The wires 76 and 80 passed through an inner side wall 102 of the housing 96 and the openings through which they pass are sealed by grommets 104.

The shaft 56 has the inner end extending through an opening 106 and the side wall 102 with the same being sealed by washer 108 carried on the portion of the shaft 56 disposed outside of the housing 96. The shaft 56 is retained in position by a cotter pin 110 through the extreme end thereof, the cotter pin being in engagement with the washer 108. The portion of the shaft 56 adjacent the wheel 58 passes through an opening 112 of the opposite side wall 114 with the opening therethrough being sealed by washer 116 disposed on the outer surface of the side wall 114.

While the warning device illustrated and described herein has been limited to one wheel assembly of a vehicle, we understood that the arrangement may be duplicated for each wheel of a vehicle.

The operation of this device will be understood from the foregoing description of the details thereof, taken in connection with the above recited objects and drawings. Further description would appear to be unnecessary.

Minor modifications of the device, varying in minor details from the embodiment of the device illustrated and described here, may be resorted to without departure from the spirit and scope of this invention, as defined in the appended claims:

Having described the invention, what is claimed as new is:

1. A warning device for indicating improper inflation of a tire, said device comprising supporting means including a horizontal member, a vertical member adjustably carried by said horizontal member, a horizontal shaft rotatably journaled at the lower end of said vertical member, a tire engageable rotatable member rigidly secured to said shaft for rotation therewith, a switch carried by said supporting means adjacent said shaft for actuation by a projecting element on said shaft.

2. A warning device for indicating improper inflation of a tire, said device comprising supporting means including a horizontal member, a vertical member adjustably carried by said horizontal member, a horizontal shaft rotatably journaled at the lower end of said vertical member, a tire engageable rotatable member rigidly secured to said shaft for rotation therewith, a switch carried by said supporting means adjacent said shaft for actuation by a projecting element on said shaft, a housing carried by said vertical member enclosing said switch and a major portion of said shaft.

3. A warning device for indicating improper inflation of a tire, said device comprising supporting means including a horizontal member, a vertical member adjustably carried by said horizontal member, a horizontal shaft rotatably journaled at the lower end of said vertical member, a tire engageable rotatable member rigidly secured to said shaft for rotation therewith, a switch carried by said supporting means adjacent said shaft for actuation by a projecting element on said shaft, a housing carried by said vertical member enclosing said switch and a major portion of said shaft, a second vertical member carried by said horizontal member in spaced parallel relation to said first-mentioned vertical member, said second vertical member being connected to said housing and shaft for aiding in the support of the same.

4. A warning device for indicating improper inflation of a tire, said device comprising support means, a shaft rotatably carried by said support means, a switch assembly carried by said support means adjacent said shaft, means on said shaft periodically engageable with said switch for actuating the same upon rotation of said shaft, a rotatable member mounted on said shaft for rotation therewith, said rotatable member being adapted to be supported closely adjacent a tire by said support means.

5. A warning device for indicating improper inflation of a tire, said device comprising support means, a shaft rotatably carried by said support means, a switch assembly carried by said support means adjacent said shaft, a cam on said shaft in alignment with said switch for actuating the same upon rotation of said shaft, a rotatable member mounted on said shaft for rotation therewith, said rotatable member being adapted to be supported closely adjacent a tire by said support means.

6. A warning device for indicating improper inflation of a tire, said device comprising support means, a shaft rotatably carried by said support means, a switch assembly carried by said support means adjacent said shaft, said switch including a fixed contact mounted in spaced relation to said shaft, a movable contact normally mounted in spaced relation to said fixed contact and adjacent said shaft, resilient means urging said movable contact out of engagement with said fixed contact, means on said shaft periodically engageable with said movable contact upon rotation of said shaft to urge the same into engagement with said fixed contact, a rotatable member mounted on said shaft for rotation therewith, said rotatable member being adapted to be supported closely adjacent a tire by said support means.

7. A warning device for indicating improper inflation of a tire, said device comprising support means, a shaft rotatably carried by said support means, a switch assembly carried by said support means adjacent said shaft, said switch including a fixed contact mounted in spaced relation to said shaft, a movable contact normally mounted in spaced relation to said fixed contact and adajcent said shaft, resilient means urging said movable contact out of engagement with said fixed contact, a cam on said shaft in alignment with said movable contact upon rotation of said shaft to urge the same into engagement with said fixed contact, a rotatable member mounted on said shaft for rotation therewith, said rotatable member being adapted to be supported closely adjacent a tire by said support means.

8. A warning device for indicating improper inflation of a tire, said device comprising a rotatable member, supporting means for supporting said rotatable member closely adjacent a tire, a shaft rotatably carried by said support means, said rotatable member being rigidly mounted on said shaft in line for rotation therewith, a switch carried by said support means adjacent said shaft, a switch actuating member carried by said shaft and engageable with said switch.

9. A warning device for indicating improper inflation of a tire, said device comprising supporting means for supporting a rotatable member closely adjacent a tire, said rotatable member being rigidly mounted on a shaft carried by said support means, a switch carried by said support means adjacent said shaft, a switch actuating member engageable with said switch carried by said shaft, said switch actuating member being in the form of a cam.

RAYMOND B. ANDERSON.

References Cited in the file of this patent

UNITED STATES PATENTS

| Number | Name | Date |
|---|---|---|
| 2,057,445 | Prospero | Oct. 13, 1936 |
| 2,317,509 | Anderson | Apr. 27, 1943 |
| 2,593,824 | Wilson | Apr. 22, 1952 |